United States Patent [19]

Simpson

[11] Patent Number: 5,373,291
[45] Date of Patent: Dec. 13, 1994

[54] DECODER CIRCUITS

[75] Inventor: Richard Simpson, Carlton, England

[73] Assignee: Texas Instruments Incorporated, Dallas, Tex.

[21] Appl. No.: 822,026

[22] Filed: Jan. 15, 1992

[51] Int. Cl.$^5$ .......................... H03M 7/30; H03M 7/28
[52] U.S. Cl. ................................................ 341/87; 341/79
[58] Field of Search ............................ 341/87, 79, 55

[56] References Cited

U.S. PATENT DOCUMENTS 3,803,589  4/1974  Hatsukano et al. .
3,918,047  11/1975  Denes ..................................... 341/79
4,176,287  11/1979  Remedi .

Primary Examiner—Sharon D. Logan
Attorney, Agent, or Firm—William E. Hiller; Richard L. Donaldson

[57] ABSTRACT

A decoder circuit for generating mask patterns on a plurality of output terminals in response to multibit binary input number is described using a plurality of two-input multiplexers arranged in parallel paths to form one stage or as a tree structure consisting of several cascaded stages of binary or higher order and controlled by functions of the bits of an input number to produce a logic "1" voltage on a number of output terminals equal to the input number and a logic "0" voltage on the remaining output terminals.

8 Claims, 4 Drawing Sheets

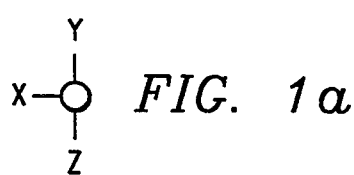
FIG. 1a
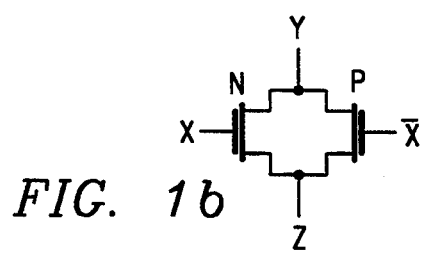
FIG. 1b
FIG. 2
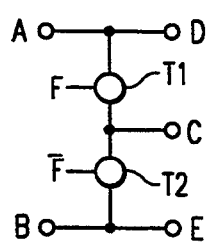
FIG. 3
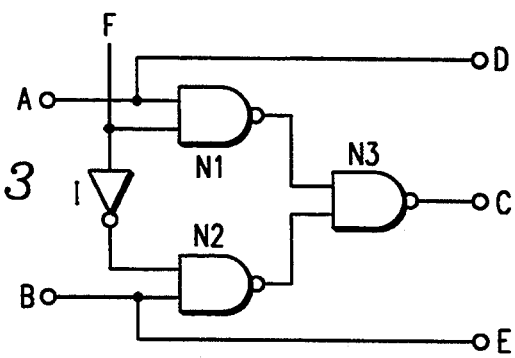
FIG. 4
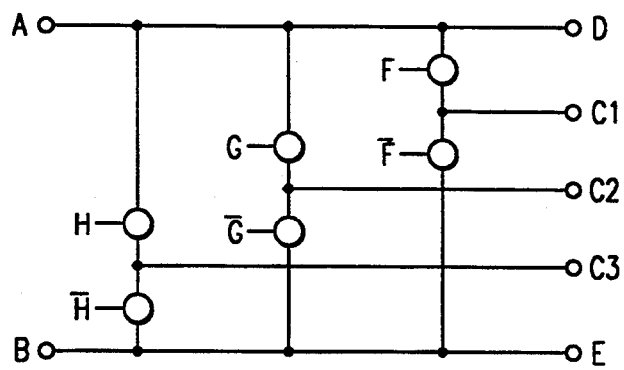
FIG. 5
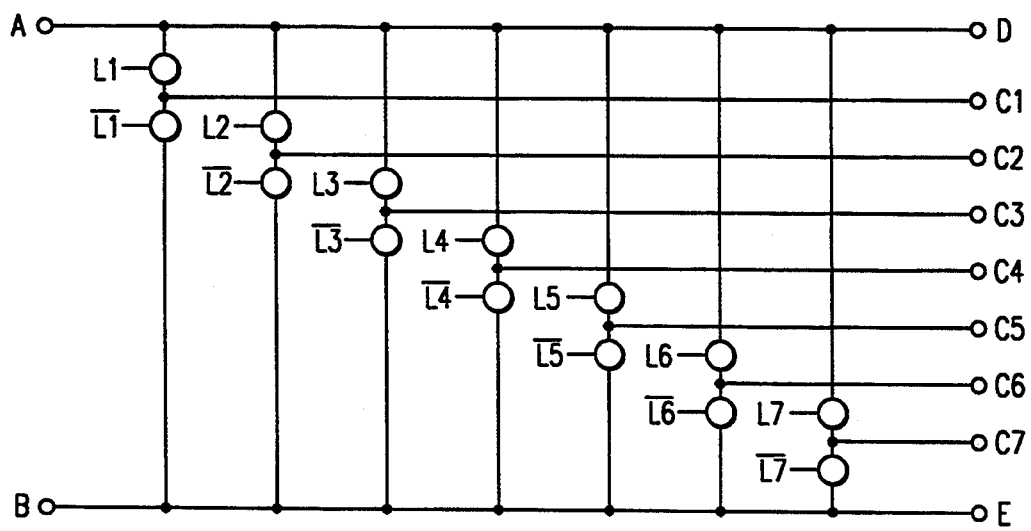

DECODER CIRCUITS

The present invention relates to decoder circuits, especially but not exclusively for generating mask patterns in response to multi-bit binary input numbers.

In microprocessors and other forms of digital signal processing circuit it is frequently required to select certain of the bits of a multi-bit word in order that they can be used for a specific purpose. For example, an instruction word for a microprocessor may include a first group of bits representing a function and a second group of bits representing a memory address to the contents of which the function represented by the first group of bits is to be applied. In order to separate the first group of bits out from the word, it would be possible to use a counter and to apply the bits sequentially to a gate, allowing only those bits which form the address to pass so that they can be routed to the memory in order to select that address. A disadvantage with that simple approach is that it takes a relatively long time and would unnecessarily delay the operation of the processor. In order to achieve the division of the word in a shorter period of time it has been proposed to apply the word in parallel to a plurality of gates which are opened selectively by a so-called mask pattern so that only the bits required are passed by the gates. Such mask patterns may conveniently be generated by a read-only memory, but if many different mask patterns are required a relatively large memory must be provided which will occupy a correspondingly large area of the semi-conductor wafer on which the processor is formed.

It is an object of the present invention to provide an improved decoder circuit capable of generating mask patterns.

According to a first aspect of the present invention there is provided a decoder circuit for generating a mask pattern in response to a multi-bit binary input number, the circuit including a plurality of logic circuits connected in parallel between first and second conductors for receiving respectively first and second logic level voltages, each logic circuit including two transmission gates connected in series with a respective decoder output terminal connected to the junction of the two gates, the transmission gates of the same logic circuit being respectively controlled by a function of one or more bits of the input number and the inverse of that function, the functions being such that for any input number the first logic level voltage appears at the decoder output terminal corresponding to that input number and also at each decoder output terminal corresponding to a number smaller than that input number, the second logic level appearing at the remaining output terminals.

In place of the two transmission gates a two-input multiplexer controlled by the function of bits of the input number can be used.

The decoder circuit may be cascaded with a plurality of further decoder circuits each of similar construction to the first-mentioned decoder circuit and each having the same plurality of logic circuits as each other, which plurality may be different from the plurality of logic circuits of the first-mentioned decoder circuit, each of the further decoder circuits having its first and second conductors connected to adjacent output terminals of the first-mentioned decoder circuit, or the first or the second conductor of the first-mentioned decoder circuit, and having its transmission gates or multiplexers respectively controlled by functions of the same bits of the input number, the bits being of lesser significance than those applied to the first-mentioned decoder circuit.

The cascading of decoder circuits may be continued in the same way for other bits of the input number. A simpler decoder circuit or a plurality of such simpler circuits can be cascaded with a decoder circuit as described above if the circuit is required to respond to a single additional bit only. The simpler circuit includes only one logic circuit connected between the first and second conductors, the logic circuit comprising two transmission gates connected in series, respectively controlled by the additional bit and its inverse. A single decoder output terminal is connected to the junction of the transmission gates. As mentioned above a two-input multiplexer can be used in place of the two transmission gates.

According to a second aspect of the present invention there is provided a decoder circuit for generating mask patterns in response to a multi-bit binary input number, the circuit including a plurality of stages containing logic circuits, the output terminals of the logic circuits of one stage being connected to the input terminals of the logic circuits of the next stage, first and second supply conductors for receiving first and second logic level voltages and a plurality of output terminals corresponding respectively to the different possible input numbers, the bits of the input number being subdivided into groups of one or more adjacent bits, each group of bits being connected to control the logic circuits of a corresponding stage of the decoder, each logic circuit being a two-input multiplexer circuit connected to supply the voltage from a first input conductor or to supply the voltage from a second input conductor to an output conductor, the multiplexer circuit being controlled by a function of the group of bits corresponding to the stage of the decoder to which the particular logic circuit belongs, each stage containing $2^M$ sets of logic circuits, there being $2^N-1$ logic circuits to a set, where, for any stage, M is the number of the place in the input number, starting from zero for the most significant bit, of the bit which is the most significant of the group corresponding to the particular stage, and N is the number of bits of the input number in the group corresponding to the particular stage, the logic circuits of a set having their first and second input conductors connected respectively to common first and second input terminals and their output conductors connected to different output terminals, the input terminals for a set also being connected to output terminals for that set, the first and second input conductors of the first stage being connected to the first and second supply conductors, and the output terminals of the logic circuits of the last stage being connected to the decoder output terminals, the cascade connection of the logic circuits and the functions of the bits controlling the multiplexer circuits forming the logic circuits being such that for any input number the first logic level voltage appears at the decoder output terminal corresponding to that input number and at each decoder output terminal corresponding to a number smaller than that input number, and the second logic level voltage appears at the remaining decoder output terminals.

The two-input multiplexer circuit may comprise two transmission gates connected in a series path from the first input conductor to the second input conductor with the output conductor connected to the junction of the two transmission gates, the transmission gates being respectively controlled by the function of the group of bits and the inverse of that function.

In another example, the two-input multiplexer circuit comprises first and second two-input NAND gates having their outputs connected to the inputs of a third two-input NAND gate, the first and second input conductors being connected to one input of the first and second NAND gates respectively, the other input of those NAND gates being connected to receive a control signal and its inverse arespectively, the output of the third NAND gate being connected to and output terminal of the multiplexer circuit.

Embodiments of decoder circuits for generating masks will now be described with reference to the accompanying drawings, of which:

FIG. 1a shows the symbol used in FIGS. 2, 4, 5, 7, 8 and 9 for a transmission gate;

FIG. 1b shows the circuit of a transmission gate;

FIG. 2 shows a two-input multiplexer consisting of two transmission gates;

FIG. 3 shows a two-input multiplexer using NAND gates and an inverter;

FIG. 4 shows one example of decoder circuit;

FIG. 5 shows another example of a decoder circuit;

Figure 6:
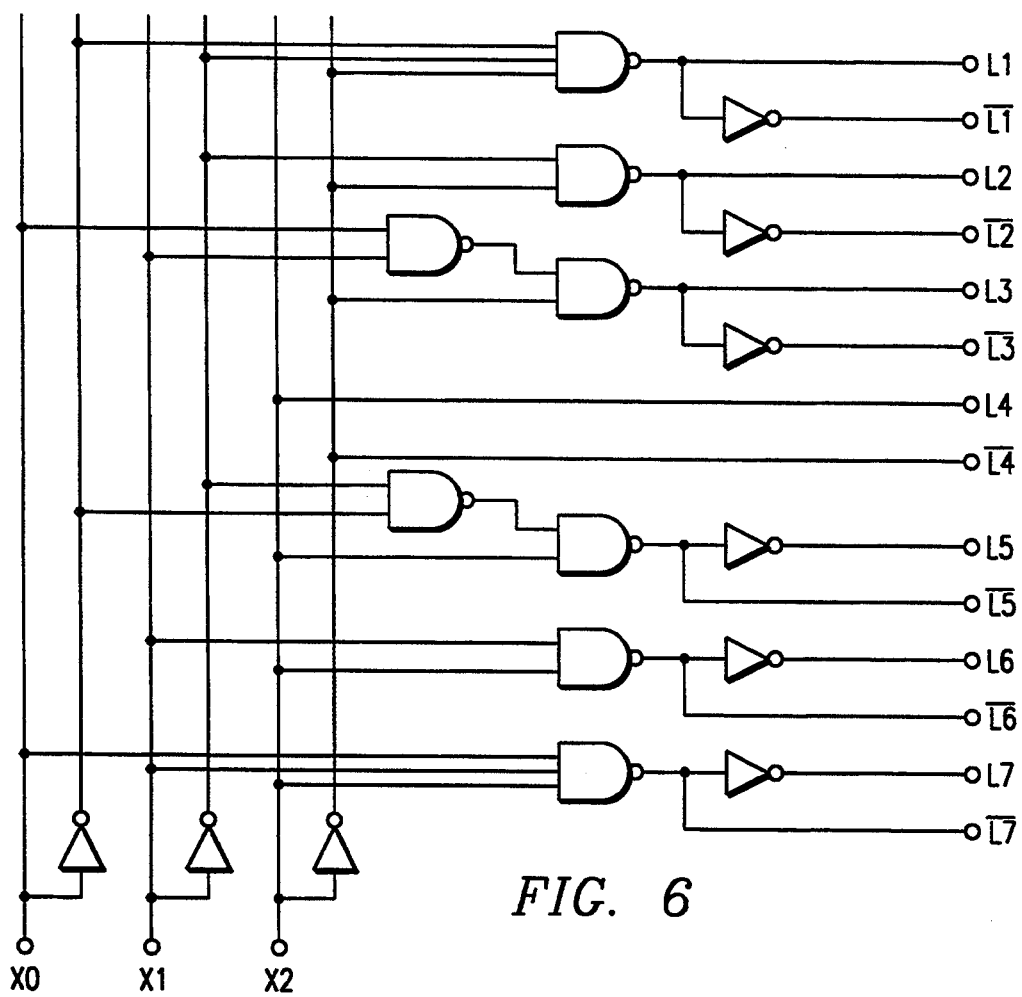
FIG. 6 shows a logic circuit for producing functions of three bits suitable for controlling the decoder shown in FIG. 5.

FIG. 1a shows the symbol used for a transmission gate in the diagrams of decoder circuits and FIG. 1b shows the circuit diagram of a transmission gate using conventional symbols. The transmission gate is a well-known component used in digital circuits and consists of two MOSFETS (metal-oxide-semiconductor field-effect transistors) connected in parallel, one of the MOSFETS having an N channel and the other having a P channel. The gate electrodes of the transistors receive complementary control signals X and $\overline{X}$. When the control signal X is 1 (assuming positive logic) and the complementary control signal $\overline{X}$ is 0, the P-channel transistor conducts a logic 1 voltage (say +5 volts) from terminal Y to terminal Z and the N-channel transistor is non-conducting. On the other hand, when the control signal X is 0 and the complementary control signal $\overline{X}$ is 1, the P-channel transistor is non-conducting and the N-channel transistor can conduct a logic 0 voltage (say 0 volts) from the terminal Y to the terminal Z. In FIG. 1a only the control signal X is shown as an input, it being assumed that an inverter is provided to produce the complementary control signal $\overline{X}$.

FIG. 2 shows a two-input multiplexer formed by two transmission gates T1 and T2 each represented by the symbol shown in FIG. 1(a). The gates T1 and T2 are connected in series between a terminal A with a logic 1 voltage and a terminal B with a logic 0 voltage, and receive as control signals F and $\overline{F}$ respectively. That means that when the gate T1 is open to pass a logic 1 voltage the gate T2 is closed and when the gate T2 is open to pass a logic 0 voltage the gate T1 is closed. The common connection of the gates T1 and T2 is connected to an output terminal C.

In operation, the terminal A is at logic 1 voltage and the terminal B is a logic 0 voltage so that when the control signal F is at logic 1, the logic 1 voltage on the terminal A is connected to the terminal C and when the control signal F is at logic 0 the logic 0 voltage on the terminal B is connected to the terminal C. As used in the decoder circuits to be described, the terminals A and B are also connected to output terminals D and E to relay the logic 1 and logic 0 voltages to subsequent stages.

FIG. 3 shows an alternative construction of a two-input multiplexer having the same input and output terminals A, B, C, D and E as the circuit shown in FIG. 2, but which consists of three two-input NAND gates N1, N2 and N3 and an inverter I. In FIG. 3, the terminal A is connected to one input of gate N1 and the terminal B is connected to one input of the gate N2. The control signal F is applied as a second input to the gate N1 and through the inverter I to a second input of the gate N2. The outputs of the gates N1 and N2 are connected to the inputs of the gate N3, the output of which is connected to the output terminal C. The NAND gates used in the circuit of FIG. 3 may be constructed of bipolar or MOS transistors with the digital signal logic levels selected appropriately.

FIG. 4 shows a simple example of a decoder for decoding a two bit binary number using three two-input multiplexers. As shown in FIG. 4 the multiplexers are of the type shown in FIG. 2 but, if desired, they could be replaced by the type shown in FIG. 3. The same change of multiplexers could be made to the other decoders to be described later. All three of the multiplexers nave their inputs connected to the terminals A and B and have their outputs respectively connected to output terminals C1, C2 and C3. The control signals for the multiplexers are respectively F, G and H, which are logically derived from the two bits of the binary number to be decoded. If the two bits of the binary number are X0 and X1, then F=X0+X1, G=X1 and H=(X0)(X1), where "+" represents OR and "(−)(−)" represents AND.

In use, the terminal B is connected to a supply maintained at logic level 0 and the terminal A is connected to a supply maintained at logic level 1. Typically, these would be 0 volts and +5 volts respectively. When the input signal value is 00 none of the multiplexers is conducting from the input terminal A and all are conducting from the input terminal B so that on the output terminals D, C1, C2, C3 and E the logic values 1, 0, 0, 0, 0 appear respectively. When the input signal value is 01 the right-hand multiplexer provides conduction from the terminal A to the terminal C1 but the other two multiplexers provide conduction from the terminal B to the terminals C2 and C3 so that the output logic levels become 1, 1, 0, 0, 0 respectively. When the input value is 10 both the central and right-hand multiplexers are conducting from the terminal A and the left-hand multiplexer is conducting from the terminal B so that the output logic levels are 1, 1, 1, 0, 0. When the input value is 11 all of the multiplexers are conducting from the terminal A so that the logic level 1 appears at the output terminals D, C1, C2 and C3, and only the terminal E is at logic level 0.

The decoder shown in FIG. 4, and indeed the other decoders to be described as well, produce a multi-bit word in which a plurality of bits at one end are 1's and the remaining bits are 0's. Whilst such a word may be usable as a mask, more often a mask is required to select one or more bits from the middle of a word. That kind of mask can be produced from the outputs of the decoders by generating a first word having say m 1's, storing that word in a register, then generating a second word having say n 1's and logically combining the two words to produce a mask having n 0's at one end, m−n 1's in the middle and the remaining bits 0's.

FIG. 5 shows a decoder of the type shown in FIG. 4 with logic level 1 and logic level 0 voltages respectively applied to the terminals A and B, but capable of decoding a three bit binary number and having seven terminals C1 to C7 between the output terminals D and E. There are seven two-input multiplexers connected in parallel between the terminals A and B and respectively responsive to control signals L1, L2, L3, L4, l5, L6 and L7 and the inverses of those control signals. In a similar manner to that shown in FIG. 4, the outputs of the seven multiplexers are respectively connected to the terminals C1, C2, ..., C7.

If the bits of the binary number to be decoded are X0 and X1 and X2 in ascending order of significances. the control signals L1, L2, ..., L7 are derived from those bits as the following logical functions:

L1 = X0 + X1 + X2
L2 = X1 + X2
L3 = (X0)(X1) + X2
L4 = X2
L5 = (X0 + X1)(X2)
L6 = (X1)(X2)
L7 = (X0)(X1)(X2)

FIG. 6 is a logic circuit diagram of one possible arrangement for generating the control signals L1 to L7 and their inverses from the bits X0, X1 and X2. There are, of course, many other logic circuits capable of performing the same operations.

In the operation of the decoder shown in FIGS. 5 and 6, the multiplexers are switched in such a way that whatever binary number is applied to the logic circuit, the corresponding control signal L becomes high along with all of the control signals L corresponding to smaller binary numbers, and all the control signals L corresponding to larger binary numbers remain low. That means that for the binary number X2X1X0=n, the output terminals D and C1, C2, ... Cn assume the logic "1" voltage on terminal A, whilst the output terminals Cn+1, ..., C7 and E assume the logic "0" voltage on terminal B.

Figure 7:
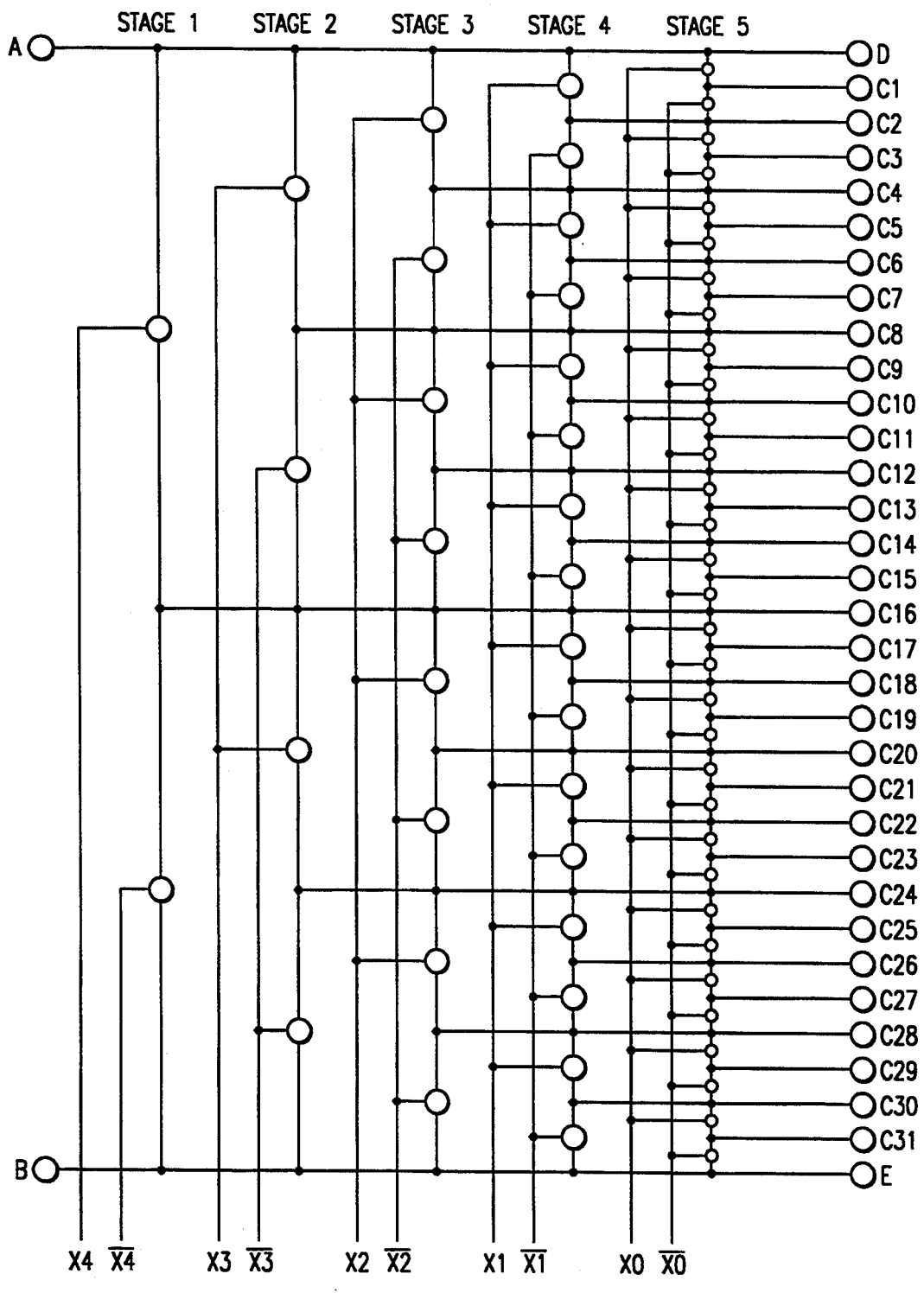
FIG. 7 shows a further example of a decoder circuit.

FIG. 7 shows an alternative form of construction of a decoder in which thirty one two-input multiplexers are connected in the form of a binary tree. As shown the multiplexers are of the type described above with reference to FIG. 2, but they could be as shown in FIG. 3. The multiplexers are divided into five stages, the first stage having one multiplexer, the second stage having two multiplexers, the third stage having four multiplexers, the fourth stage having eight multiplexers, and the fifth stage having sixteen multiplexers. In each stage the multiplexers are connected between adjacent outputs of the preceding stage.

The decoder of FIG. 7 receives a five bit input number and has thirty one output terminals C1, C2, ..., C31 in addition to the terminals D and E, which are respectively directly connected to the input terminals A and B. The five bits of the input number are respectively applied to the control inputs of the multiplexers in the five stages of the decoder, the first stage receiving the most significant bit, the second stage the next most significant bit and so on, with the fifth stage receiving the least significant bit. As shown in FIG. 7, the five bits are X4, X3, X2, X1 and X0 in descending order of significance.

Because the multiplexers used in FIG. 7 are of the type shown in FIG. 2, each stage of the decoder receives the inverse of the bit of the input number as well as the bit itself. If a different type of multiplexer were to be used then the logic levels of the signals representing the bits of the input number would be selected accordingly.

In the operation of the decoder shown in FIG. 7, the logic "1" and logic "0" voltages are respectively applied to the terminals A and B, and the logic "1" voltage appears at the output terminal D and, depending on the value of the input number, as many of the terminals C, starting from the top, as are represented by the value of the input number. For example, if the input number were 01101 (=13) then the logic "1" voltage would appear at output terminals D and C1, C2, ..., C13, with the logic "0" voltage appearing at output terminals C14, C15, ..., C31 and E.

Figure 8:
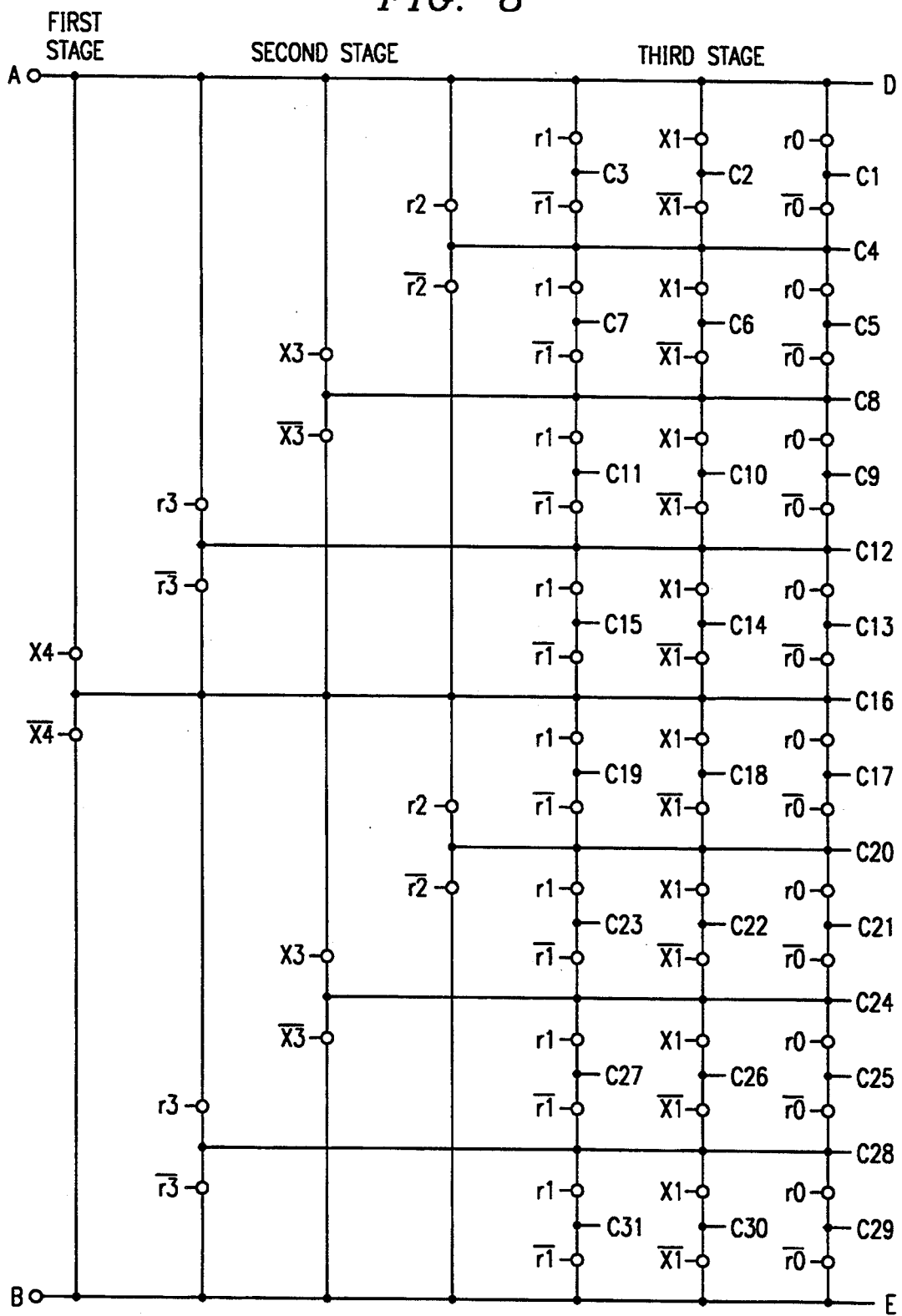
FIG. 8 shows yet another example of a decoder circuit.

Other forms of decoders can be produced using both the parallel connection of multiplexers as shown in FIGS. 4 and 5 and the tree structure shown in FIG. 7. FIG. 8 shows one example of such a decoder, again constructed from multiplexers of the type shown in FIG. 2. The decoder shown in FIG. 8 consists of three stages, a first stage on the left consisting of a single multiplexer, a second stage receiving the outputs of the first stage and consisting of two sets of three multiplexers connected in parallel, and a third stage receiving the outputs of the second stage and consisting of eight sets of three multiplexers connected in parallel. The third stage produces outputs on terminals D, E and C1, C2, ..., C31.

The decoder shown in FIG. 8 receives a five bit input number X4 X3 X2 X1 X0, of which the bit X4, the most significant bit, is applied to control the single multiplexer of the first stage. The second stage is controlled in a manner similar to that described above with reference to FIG. 4 by bits X3 and X2, of which X3 is used to control one multiplexer of each set and it is also used to produce control signals r3 and r2 for controlling the other two multiplexers of each set. The control signals r3 and r2 are logical functions of X3 and X2:

r3 = (X3)(X2)
r2 = X3 + X2

The third stage is controlled by bits X1 and X0 in a similar way to the control of the second stage by bits X3 and X2, using as control signals r1=(X1)(X0),X1 and r0=X1+X0.

In operation, the decoder of FIG. 8 produces the same outputs as the decoder of FIG. 7 for the same five bit input number, but it has the advantage over the FIG. 7 decoder that there are no more than three multiplexers connected in series between the supply terminals A and B and any output terminal in FIG. 8, whereas in FIG. 7 there are five multiplexers connected in series for substantially half the output terminals. That means that the time required for the circuit of FIG. 8 to set up the output signals is shorter than that required for the circuit of FIG. 7.

It is sometimes required to produce masks for two different word lengths, for example 16 bits and 32 bits. Each of the decoders described above is constructed to produce a mask of a particular length and would require at least an additional gating stage to produce masks of different lengths, and such additional gating would introduce an undesirable delay into the time for generating a mask. A modification to the decoder of FIG. 8 enabling it to generate either a single mask of thirty two bits or two similar masks each of sixteen bits is shown in FIG. 9.

Figure 9:
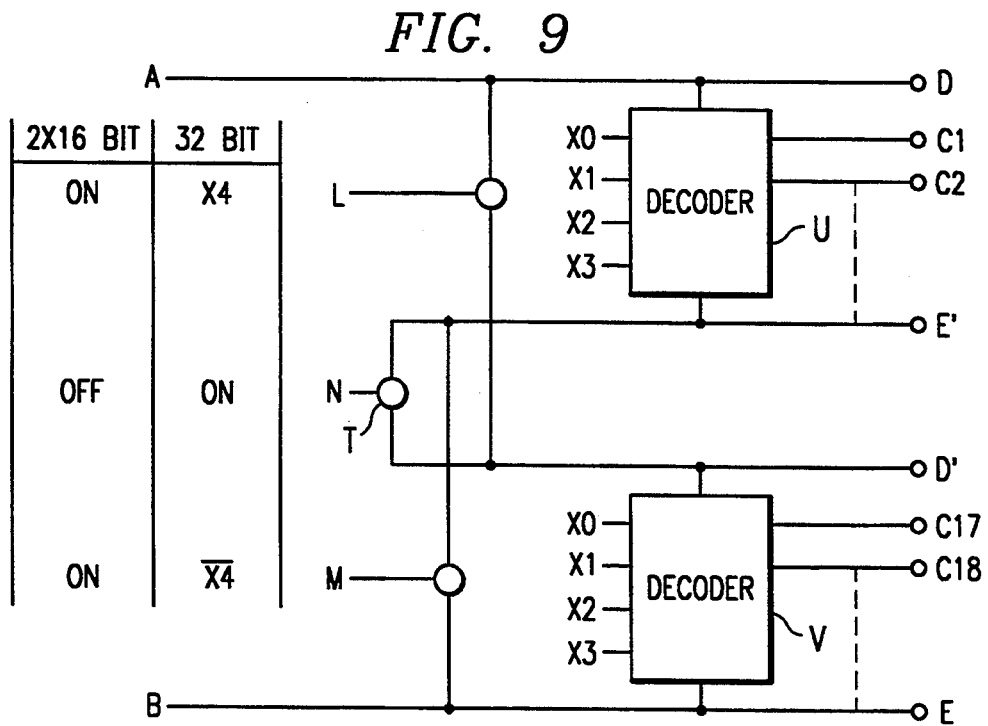
FIG. 9 shows a decoder circuit with means for switching between two decoders and a single decoder twice the size.

Comparison of FIGS. 8 and 9 shows that the first stage of the decoder of FIG. 8 is modified in FIG. 9 by splitting the multiplexer into its two transmission gates controlled by signals L and M and providing two conductors connected to output terminals D' and E' in place of a single conductor connected to output terminal C16. An additional transmission gate T controlled by a signal N is provided in FIG. 9 connecting the terminal D' and E' together. The decoders U and V of FIG. 9 together form the second and third stages of FIG. 8.

In operation, when the decoder of FIG. 9 is working as a single 32-bit decoder the signal N turns on the transmission gate T thereby connecting the output terminals D' and E' together, and the signals L and M represent X4 and $\overline{X4}$ respectively. In that state the decoder operates in the same way as that shown in FIG. 8.

On the other hand, when the decoder of FIG. 9 is working as two 16-bit decoders, the signals L and M turn on the respective transmission gates and the transmission gate T is turned off by the signal N. In this case, the decoders U and V respond to bits X0, X1, X2 and X3 of an input number to produce similar sixteen bit masks, the terminal D being connected to the terminal D' and the terminal E being connected to the terminal E'.

I claim:

1. A decoder circuit for generating a mask pattern in response to a multi-bit binary input number, the circuit including a plurality of logic circuits connected in parallel between first and second conductors for receiving respectively first and second logic level voltages, each logic circuit including two transmission gates connected in series with a respective decoder output terminal connected to the junction of the two gates, the transmission gates of the same logic circuit being respectively controlled by a function of one or more bits of the input number and the inverse of that function, the functions being such that for any input number the first logic level voltage appears at the decoder output terminal corresponding to that input number and also at each decoder output terminal corresponding to a number smaller than that input number, the second logic level appearing at the remaining output terminals.

2. A decoder circuit for generating a mask pattern in response to a multibit binary input number, the circuit including a plurality of two input multiplexers, each having its inputs connected to first and second conductors for receiving respectively first and second logic level voltages and its output connected to a decoder output terminal, the multiplexers being controlled by functions of one or more bits of the input number, the functions being such that for any input number the first logic level voltage appears at the decoder output terminal corresponding to that input number and also at each decoder output terminal corresponding to a number smaller than that input number, the second logic level appearing at the remaining output terminals.

3. A decoder circuit for generating a mask pattern in response to a multibit binary input number including a decoder circuit according to claim 1 cascaded with a plurality of further decoder circuits according to claim 1, each of the further decoder circuits having the same plurality of logic circuits as each other, which plurality may be different from the plurality of logic circuits of the first-mentioned decoder circuit, each of the further decoder circuits having its first and second conductors connected to adjacent output terminals of the first-mentioned decoder circuit, or the first or the second conductor of the first-mentioned decoder circuit and having its transmission gates or multiplexers respectively controlled by functions of the same bits of the input number, the bits being of lesser significance than those applied to the first-mentioned decoder circuit.

4. A decoder circuit according to claim 3 including additional decoder circuits cascaded with the first-mentioned and further decoder circuits and responsive to other bits of the input number.

5. A decoder circuit for generating mask patterns in response to a multi-bit binary input number, the circuit including a plurality of stages containing logic circuits, the output terminals of the logic circuits of one stage being connected to the input terminals of the logic circuits of the next stage, first and second supply conductors for receiving first and second logic level voltages and a plurality of output terminals corresponding respectively, to the different possible input numbers, the bits of the input number being subdivided into groups of one or more adjacent bits, each group of bits being connected to control the logic circuits of a corresponding stage of the decoder circuit, each logic circuit being a two-input multiplexer circuit connected to supply the voltage from a first input conductor or to supply the voltage from a second input conductor to an output conductor, the multiplexer circuit being controlled by a function of the group of bits corresponding to the stage of the decoder circuit to which the particular logic circuit belongs, each stage containing $2^M$ sets of logic circuits, there being $2^N$-1 logic circuits to a set, where, for any stage, M is the number of the place in the input number, starting from zero for the most significant bit, of the bit which is the most significant of the group corresponding to the particular stage, and N is the number of bits of the input number in the group corresponding to the particular stage, the logic circuits of a set having their first and second input conductors connected respectively to common first and second input terminals and their output conductors connected to different output terminals, the input terminals for a set also being connected to output terminals for that set, the first and second input conductors of the first stage being connected to the first and second supply conductors, and the output terminals of the logic circuits of the last stage being connected to the decoder output terminals, the cascade connection of the logic circuits and the functions of the bits controlling the multiplexer circuits forming the logic circuits being such that for any input number the first logic level voltage appears at the decoder output terminal corresponding to that input number and at each decoder output terminal corresponding to a number smaller than that input number, and the second logic level voltage appears at the remaining decoder output terminals.

6. A decoder circuit according to claim 5 wherein the two-input multiplexer circuit comprises two transmission gates connected in series from the first input conductor to the second input conductor, with the output conductor connected to the junction of the two transmission gates, the transmission gates being respectively controlled by the function of the group of bits and the inverse of that function.

7. A decoder circuit according to claim 5 wherein the two-input multiplexer circuit comprises first and second two-input NAND gates having their outputs connected to the inputs of a third two-input NAND gate, the first and second input conductors being connected to one input of the first and second NAND gates respectively, the other input of those NAND gates being connected to receive the function of the group of bits and the inverse of that function respectively, and the output of the third NAND gate being connected to an output terminal of the multiplexer circuit.

8. A decoder circuit for generating a mask pattern in response to a multibit binary input number, the circuit including a first stage having first, second and third transmission gates connected in series between first and second supply conductors respectively for first and second logic level voltages, and first and second output conductors connected respectively to the junction between the first and second transmission gates and the junction between the second and third transmission gates, a second stage having first and second decoders of identical construction and both responsive to the bits of the input number except the most significant, the decoders each having first and second input conductors and logic circuits operative to connect the input conductors selectively to a plurality of output conductors under the control of the bits of the input number so as to generate a mask pattern determined by the bits of the input number except the most significant, the first and second input conductors of the first decoder being respectively connected to the first supply conductor and the second output conductor of the first stage, the first and second input conductors of the second decoder being respectively connected to the first output conductor of the first stage and the second supply conductor, and means for selectively applying control signals to the transmission gates, so that, in one case, the first and third transmission gates are conductive and the second transmission gate is non-conductive, thereby enabling the first and second decoders to operate in parallel to produce the same mask outputs determined by the bits of the input number except the most significant, and, in the other case, the first and third transmission gates are respectively controlled by the most significant bit of the input number and its inverse, and the second transmission gate is conductive thereby enabling the circuit to operate as a single decoder responsive to all the bits of the input number to produce a single mask output of twice the number of bits produced by either of the decoders alone.

* * * * *